United States Patent [19]

Sawai

[11] Patent Number: 5,175,834
[45] Date of Patent: Dec. 29, 1992

[54] SWAPPING APPARATUS WITH REDUCED SECONDARY STORAGE BASED ON FREQUENCY OF USE OF PAGE REGIONS

[75] Inventor: Wataru Sawai, Tokyo, Japan

[73] Assignee: NEC Corporation, Tokyo, Japan

[21] Appl. No.: 508,574

[22] Filed: Apr. 13, 1990

[30] Foreign Application Priority Data

Apr. 14, 1989 [JP] Japan .................................. 1-94924

[51] Int. Cl.⁵ .......................................... G06F 12/12
[52] U.S. Cl. ............................ 395/425; 364/DIG. 1
[58] Field of Search ... 364/200 MS File, 900 MS File

[56] References Cited

U.S. PATENT DOCUMENTS

| 3,964,028 | 6/1976 | Belady et al. | 364/200 |
|---|---|---|---|
| 4,080,652 | 3/1978 | Cronshaw et al. | 364/200 |
| 4,126,893 | 11/1978 | Cronshaw et al. | 364/200 |
| 4,277,826 | 7/1981 | Collins et al. | 364/200 |
| 4,422,145 | 12/1983 | Sacco et al. | 364/200 |
| 4,658,351 | 4/1987 | Teng | 364/200 |

OTHER PUBLICATIONS

Madnick, Stuart E., et al., *Operating Systems*, McGraw-Hill Kogakusha, Ltd., Tokyo, 1974, pp. 185-186.

*Primary Examiner*—Joseph L. Dixon
*Assistant Examiner*—Reba I. Elmore
*Attorney, Agent, or Firm*—Foley & Lardner

[57] ABSTRACT

A swapping apparatus for use in a computer system for swapping data between a main storage and a secondary storage. The swapping apparatus operates with a reduced secondary storage capacity yet improves the overall performance of the computer system. The swapping apparatus is characterized in that whenever a process does not require the main storage, a control unit is notified of the non-requirement of the main storage in order to lower the priority of that process, collectively releasing a page-fixed region if the main storage space is insufficient. Also, an updating unit is notified so as to perform paging at a reduced use frequency of the page region. Whenever the main storage is again required, the control unit is notified of the requirement, thereby fixing the page-released region in order to raise the priority of use of the main storage by that particular process. The updating unit is then notified to perform paging at an increased use frequency.

8 Claims, 3 Drawing Sheets

SWAPPING APPARATUS WITH REDUCED SECONDARY STORAGE BASED ON FREQUENCY OF USE OF PAGE REGIONS

The present invention relates to a swapping apparatus for use in computer systems.

BACKGROUND OF THE INVENTION

A conventional swapping apparatus for use in computer systems swaps data between the main storage and the secondary storage. For one example of such an apparatus, reference may be made to Stuart E. Madnick and John J. Donovan, "Operating Systems", pp. 185-186.

Since such a swapping apparatus collectively handles inputs and outputs between the total memory contents and the secondary storage contained in a process, a separate secondary storage should be secured besides the secondary storage for the usual paging purpose. This entails the disadvantage of requiring a large secondary storage capacity.

As the whole memory contents contained in a process are always the object of collective inputting and outputting, the collective inputting and outputting can be expected to speed up the computer system if the total memory contents of the process make up a large volume. If the volume is not very large, however, there will be another disadvantage that the load of the inputting and outputting is too great, and the overall performance of the total system is made less efficient.

An object of the present invention is to provide a swapping apparatus which is free of these disadvantages, and designed to reduce the required capacity of the secondary storage and yet to improve the overall performance of the total system.

SUMMARY OF THE INVENTION

The invention makes it possible to realize a swapping apparatus which is designed so as to reduce the required capacity of the secondary storage and yet to improve the overall performance of the total system. When a process does not require the main storage, the swapping control unit is notified that the main storage is not required. The swapping control unit lowers the process priority of the main storage, collectively releases the page-fixed region if the main storage space is insufficient, and notifies the virtual memory management unit of the release, to perform paging of the page region at a reduced frequency. When the main storage is again required, the swapping control unit is notified of the requirement, collectively fixes the page-released region to raise the priority of the process using the main storage, and notifies the virtual memory management unit of the fixing, to perform paging at an increased frequency.

Thus, according to one aspect of the present invention, there is provided a swapping apparatus including a main storage having an area to be used by a plurality of processes. The swapping apparatus also has a first notifying unit for supplying, based on the state of use of its main storage by one of the plurality of processes, a notification of an alteration in the priority of use of the main storage by this process. A control unit updates the priority of use according to the output of the first notifying unit, and performs control so as to swap the total area to be used by the process, according to the updated priority of use. A virtual memory management unit performs paging on the basis of the frequency of use of page regions to be used by the plurality of processes.

The swapping apparatus also includes a first altering unit which alters the page region to be used by the process from a fixed state to a released state. A second altering unit alters the page region to be used by the process from a released state to a fixed state. A second notifying unit notifies the virtual memory management unit of an alteration in the frequency of use of each page region to be used by the process. The swapping control unit includes a controller unit for controlling the first altering unit, second altering unit and second notifying unit according to the updated priority of use. The virtual memory management unit includes an updated unit which updates, according to the output of the second notifying unit, the corresponding frequency of use.

BRIEF DESCRIPTION OF THE DRAWINGS

The features, configuration, functions and advantages of the present invention will become more apparent when taken in conjunction with the accompanying drawings, in which.

In the figures, the same reference numerals denote respectively the same constituent elements.

DETAILED DESCRIPTION OF THE PREFERRED EMBODIMENT

Figure 1:
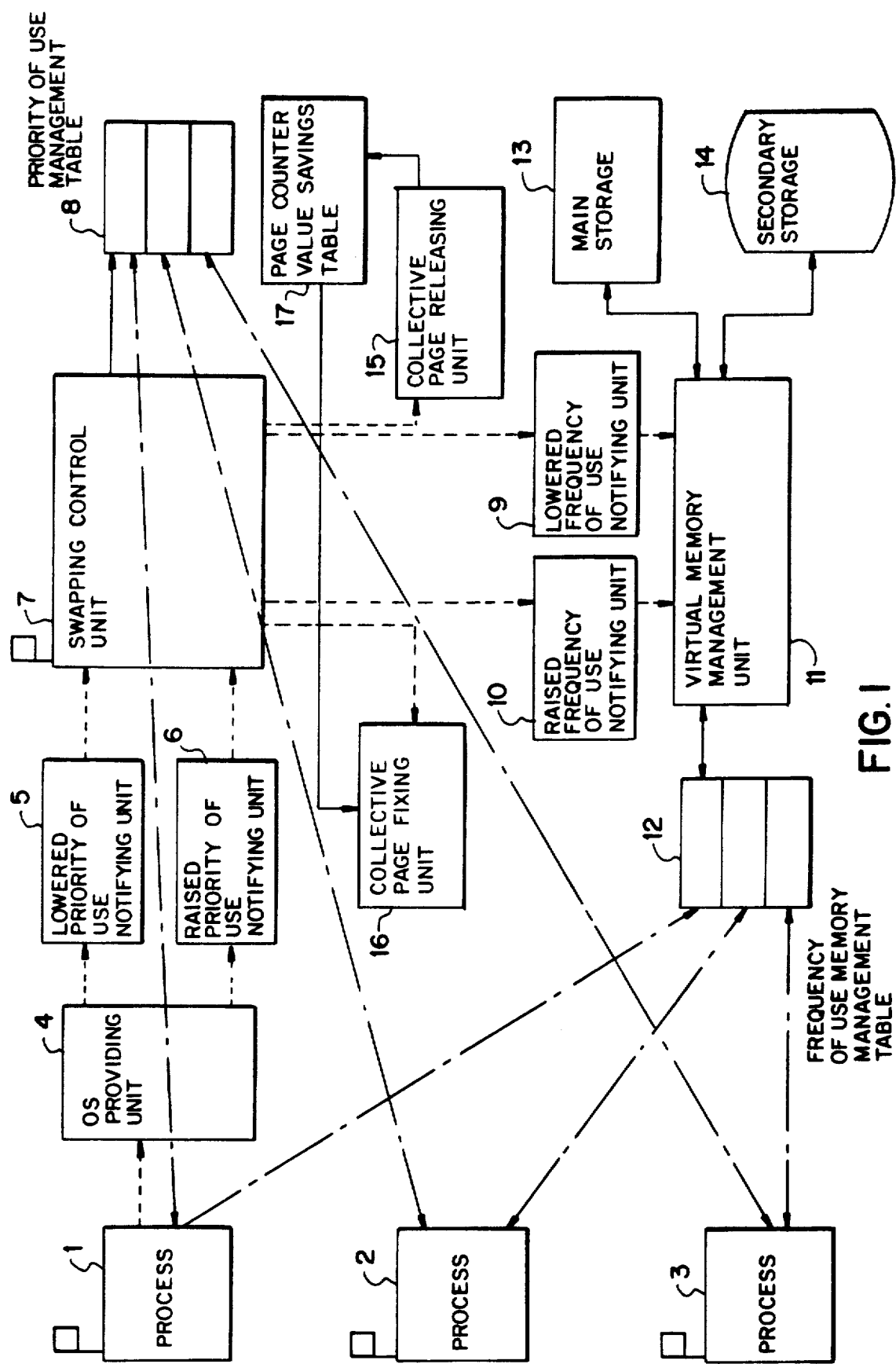
FIG. 1 illustrates a preferred embodiment of the invention.

Referring to FIG. 1, solid lines represent the flow of data; dotted lines, the flow of control; and chain lines, relationships between related data structures.

A preferred embodiment of the present invention is provided with a main storage 13, including an area to be used by a plurality of processes 1 to 3. Also included is a first notifying unit having a lowered priority of use notifying unit 5 and raised priority of use notifying unit 6. The first notifying unit supplies, on the basis of the state of use of the main storage 13 by one of the processes, notifications of alteration in the process priority of use of the main storage 13, in accordance with an instruction by the operating system providing unit 4. A swapping control unit 7 updates the applicable priority of use in a priority of use management table 8 according to the output of the first notifying unit, and swaps the total area to be used by the process according to the priority of use management table 8. A and virtual memory management unit 11 for updating the frequency of use and updates the frequency of use and performs paging on the basis of the frequency of use of each of the page regions to be used by the processes, written into a frequency of use management table 12.

One of the characteristic features of the present invention is that the swapping apparatus is further equipped with first altering unit for altering the page region to be used by the process from a fixed state to a released state, having a collective page releasing unit 15 and page counter value saving table 17. A second altering unit alters the page region to be used by the process from a released state to a fixed state, having a collective page fixing unit 16 and the page counter value saving table 17. A and second notifying unit notifies the virtual memory management unit 11 of an alteration in the frequency of use of each page region to be used by the process, having a lowered frequency of use notifying unit 9 and a raised frequency of use notifying unit 10. The swapping control unit 7 also includes a controller unit for controlling the collective page releasing means 15, collective page fixing means 16, lowered frequency of use notifying unit 9 and raised frequency of use notifying unit 10 according to the updated priority of use. The virtual memory management unit 11 includes an update unit for updating, according to the output of either the lowered frequency of use notifying unit 9 or the raised frequency of use notifying unit 10, the corresponding frequency of use in the frequency of use management table 12.

The operation of the preferred embodiment of the present invention will now be described in detail.

Figure 2A:
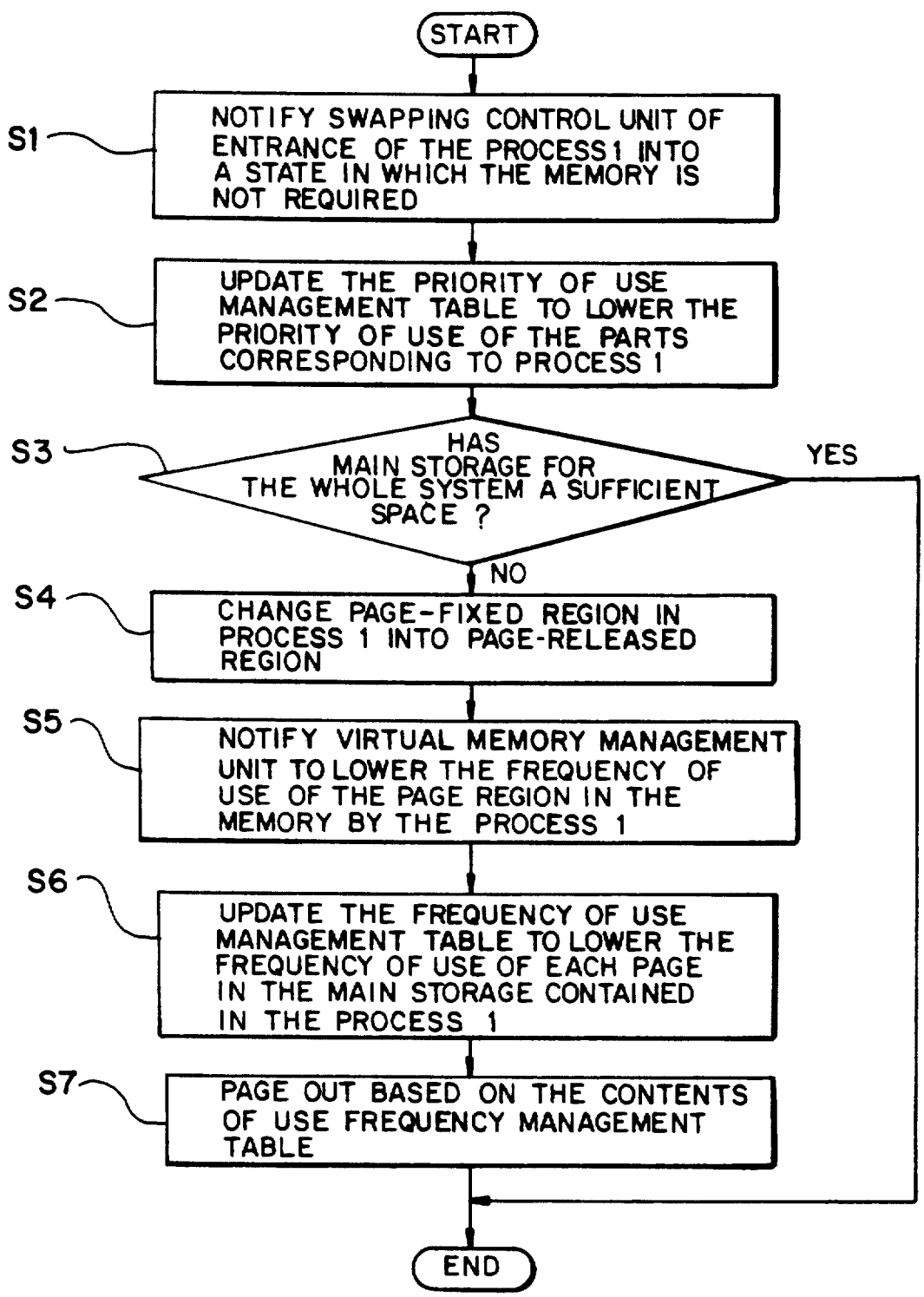
FIGS. 2A and 2B comprise charts for explaining the operation of the preferred embodiment of the invention, in which FIG. 2A relates to the swapping-out operation, and FIG. 2B relates to the swapping-in operation.

Referring to FIGS. 1 and 2A, the operating system (OS) providing unit 4 provides OS's including those required for communication management and resource management. In response to a call by the process 1, the operating system providing unit 4 enters into an hour-long wait state, waiting for a screen response input or for resources. Immediately before entering into this wait state, the operating system providing unit calls the lowered priority of use notifying unit 5, which notifies the swapping control unit 7 of the entrance of the process 1 into a state in which the memory is not required (S1). Upon receiving this notification, the swapping control unit 7 updates the priority of use management table 8, to lower the priority of use in the parts corresponding to the process 1 (S2).

If the main storage 13 for the whole system has sufficient space at this time (S3), the processing will stop.

If the main storage 13 does not have sufficient space (S3), the swapping control unit 7 will call the collective page releasing unit 15 to release the page fixed region in the process 1. At this time, the collective page releasing unit 15 saves into the page counter value saving table 17 the number of times the page-fixed region has been page-fixed. This information is used for the swap-in operation, explained hereinafter.

This collective page releasing unit 15 makes the previously page-fixed region available for swapping, to facilitate the effective use of the memory. Further, the swapping control unit 7 calls the lowered frequency of use notifying unit 9 which notifies the virtual memory management unit 11 of the need to lower the frequency of use of the page region in the memory by the process 1 (S5). Receiving this notification, the virtual memory management unit 11 updates the frequency of use management table 12 so as to lower the frequency of use of all pages in the main storage 13 contained in the process 1 (S6). Paging-out takes place according to the frequency of use management table 12 (S7). At this point, as their frequencies of use are reduced, the pages contained in the process 1 are more readily paged out than those in the other processes 2 and 3. They are more readily paged out, however, not all the pages are necessarily crossed out from the main storage 13 because the number of pages that are paged out depends on the degree of congestion of the main storage 13 for the whole system at that moment. Further, no special secondary storage for swapping use is needed because the usual paging means is utilized.

Thus the swapping-out operation one of the functions of the swapping apparatus is completed.

Next suppose that the state of waiting for a screen response input or resources has been discontinued, and the operating system providing unit 4 has been relieved of its hour-long wait state.

Figure 2B:
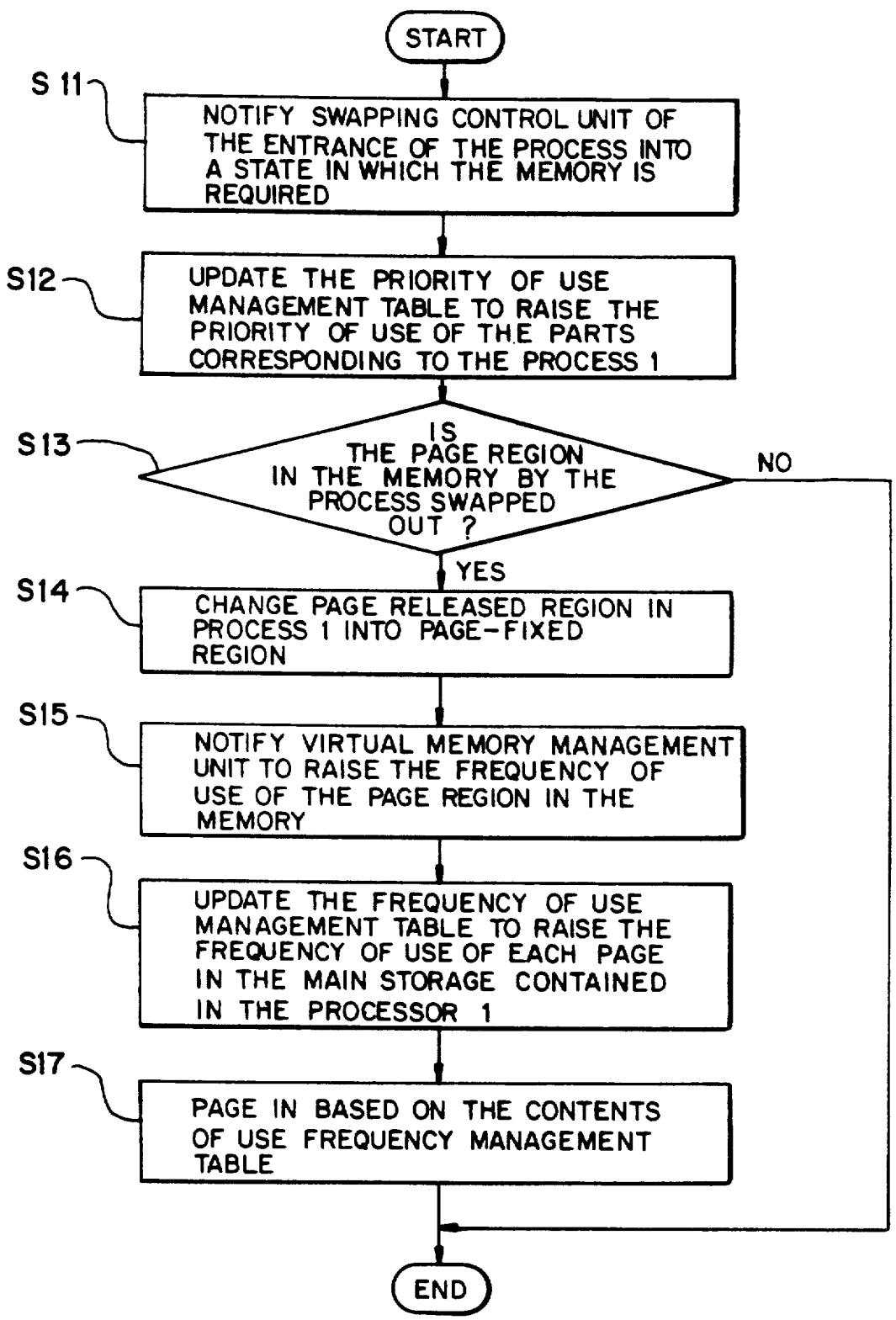

Referring now to FIG. 2B, immediately after the OS providing unit is freed of its waiting state, the raised priority of use notifying unit 6, which has been called, notifies the swapping control unit 7 of the entrance of the process 1 into a state in which the memory is required (S11).

The swapping control unit 7, upon receiving this notification, updates the priority of use management table 8 to raise the priority of use of the parts corresponding to the process 1 (S12).

Unless the main memory 13 for the whole system has sufficient space at this time to allow the memory for the process to be swapped out (S13), the processing will stop here. If it has been swapped out (S13), the swapping control unit 7 will call the collective page fixing unit 16 to return what had been a page-swapped region at the time of swapping out from a released state to a fixed state (S14).

At this time, in order to find out how many times each page-fixed region had been page-fixed before, the collective page fixing unit 16 uses the information saved into the page counter value saving table 17 at the time of swapping out. Further, the swapping control unit 7 notifies the virtual memory management unit 11 of the need to raise the frequency of page use on the main storage 13 by the process 1 (S15).

The virtual memory management unit 11, receiving this notification, updates the frequency of use management table 12 so as to raise the frequencies of use of all the pages in the memory remaining in the process (S16). Paging-in takes place according to the contents of the frequency of use management table 12. Here, the page region remaining in the process will no longer be more readily paged out than those of the other processes 2 and 3 because of its increased frequency of use.

Even if any page is found missing after the process 1 starts operating, paging-in will be achieved, merely by using the usual paging means, from the secondary storage for paging use, so that the inputting and outputting required for the paging will occur no more than they are really needed.

Thus the swapping-in operation one of the functions of the swapping apparatus, is completed.

If the updated priority of use resulting from the output of the second notifying unit is low and there is not sufficient space in the main storage, the control unit according to the present invention will actuate the first altering unit and the second notifying unit. The first altering unit releases the page regions to be used by one process, which are in a fixed state. The second notifying unit notifies the virtual memory management unit of the need to lower the frequency of use of each page region to be used by one process. If the updated priority of use resulting from the output of the second notifying unit is high, the control unit will actuate the second altering unit and the second notifying unit. The second altering unit fixes the page regions to be used by one process, which are in a released state. The second notifying unit notifies the virtual memory management unit of the need to raise the frequency of use of each page region to be used by one process. The virtual memory management unit updates, according to the output of the second notifying unit, the frequency of use of each corresponding page region, pages out the page regions whose updated frequencies of use are low, and pages in those whose updated frequencies of use are high. There is no needed for a special secondary storage for swapping use because all the page regions are not necessarily paged out or in by the foregoing operation and the usual paging means is used. Therefore, it is possible to reduce the required capacity of the secondary storage and improve the overall performance of the whole system.

As hitherto described, the present invention offers the remarkable benefit of realizing swapping means without having to use a special secondary storage for swapping use and with a smaller load of input and output operations. It further has the advantage of permitting sustantially more effective use of the memory, especially when the number of processes is great, because it can swap page-fixed regions.

What is claimed is:

1. A swapping apparatus comprising:
   main storage means including an area to be used by a plurality of processes as memory for holding page regions;
   means for storing priority of use data, including a priority of use datum for use of said main storage by each of said plurality of processes;
   means for storing frequency of use data, including a frequency of use datum for each page region to be used by each of said plurality of processes;
   first notifying means for supplying, on the basis of a state of use of said main storage means by one of said plurality of processes, a priority notification of an alteration in one of the priority of use data by said one of said plurality of processes, wherein said state of use includes whether memory is required and whether memory is not required;
   virtual memory management means for paging page regions in an out of said main storage means on the basis of said frequency of use data, so that a process with a lower frequency of use is paged out before a process with a higher frequency of use;
   first altering means for altering a state of the page region to be used by said one of said plurality of processes from a fixed state to a released state;
   second altering means for altering the state of the page region to be used by said one of said plurality of processes from a released state to a fixed state;
   second notifying means for outputting a frequency notification indicating an alteration in the frequency of use of each page region to be used by said one of said plurality of processes;
   updating means responsive to said frequency notification from said second notifying means for updating said frequency of use datum for said one of said plurality of processes; and
   control means responsive to said priority notification for updating said priority of use data according to said priority notification from said first notifying means, and for swapping according to said priority of use data, all the regions to be used by said one of said plurality of processes, and at the same time for initiating, according to said priority of use data, said second notifying means and one of said first and said second altering means.

2. The swapping apparatus as claimed in claim 1, wherein said first notifying means comprises:
   lower priority of use notifying means for supplying a lower priority of use notification; and
   raised priority of use notifying means for supplying a raised priority of use notification.

3. The swapping apparatus as claimed in claim 1, wherein said second notifying means comprises:
   raised frequency of use notifying means for outputting a raised frequency of use notification; and
   lower frequency of use notifying means for outputting a lower frequency of use notification.

4. The swapping apparatus as claimed in claim 1, further comprising frequency of use management means for storing said frequency of use data.

5. The swapping apparatus as claimed in claim 1, further comprising priority of use management means for storing said priority of use data.

6. A method for swapping data between a main storage and a secondary storage comprising the steps of:
   supplying, on the basis of the state of use of a main storage unit by one of a plurality of processes, a priority notification of an alteration in a priority of use data of said main storage unit by said one of said plurality of processes;
   performing paging on the basis of a frequency of use data for page regions to be used by said plurality of processes;
   altering a page region to be used by said one of said plurality of processes from a fixed state to a released state;
   altering a page region to be used by said one of said plurality of processes from a released state to a fixed state;
   outputting a frequency notification indicating an alteration in the frequency of use of each page region to be used by said one of said plurality of processes;
   updating, responsive to said frequency notification, the frequency of use data for said one of said plurality of processes according to said frequency of use;
   updating said priority of use data according to said priority notification so as to swap all regions to be used by said one of said plurality of processes according to said updated priority of use data; and
   initiating, responsive to said priority notification, according to said updated priority of use data, said altering steps and said updating step.

7. The swapping apparatus as claimed in claim 1 further comprising OS providing means for providing, in response to a call by said one of said plurality of processes, OS's to said first notifying means.

8. An apparatus for transferring page regions into and out of a main memory, said apparatus comprising:
   a main memory for storing page regions;
   first notifying means for supplying to a control means a priority notification of use of said main memory by processes;
   said control means updating stored priority of use data and, according to said updated priority of use data, transferring to and from said main memory, page regions to be used by a process, said control means simultaneously initiating a second notifying means and one of a first and second altering means;
   said first and second altering means being for fixing and releasing page regions;
   said second notifying means being for outputting to an updating means a frequency notification indicating alterations in frequency of use of page regions by a said process;
   said updating means being responsive to said frequency notification and updating frequency of use data of said page regions by said processes; and
   a virtual memory management means for paging page regions in and out of said main storage means on the basis of said frequency of use data, so that a page region with a lower frequency of use by said processes is paged out before a more frequently used page region.

* * * * *